US006775725B1

(12) United States Patent
Basquin et al.

(10) Patent No.: US 6,775,725 B1
(45) Date of Patent: Aug. 10, 2004

(54) PREPARATION AND EXECUTION OF A PROGRAM IN AN ADDITIONAL CHIP CARD OF A TERMINAL

(75) Inventors: Bruno Basquin, Marseilles (FR); Marc Niccolini, Aix-En-Provence (FR)

(73) Assignee: Gemplus, Gemenos (FR)

( * ) Notice: Subject to any disclaimer, the term of this patent is extended or adjusted under 35 U.S.C. 154(b) by 434 days.

(21) Appl. No.: 09/586,968

(22) Filed: Jun. 5, 2000

(51) Int. Cl.⁷ .............................................. G06F 13/00
(52) U.S. Cl. ......................... 710/102; 710/14; 710/43; 710/73; 712/225
(58) Field of Search ........................... 710/1, 3, 8–14, 710/15, 33, 101, 104, 21, 38, 45, 73, 74, 102, 43; 709/200; 712/225

(56) References Cited

U.S. PATENT DOCUMENTS

| | | | |
|---|---|---|---|
| 5,036,461 A | | 7/1991 | Elliott et al. |
| 5,288,979 A | * | 2/1994 | Kreft .......................... 235/380 |
| 5,586,166 A | * | 12/1996 | Turban ......................... 379/58 |
| 5,714,741 A | * | 2/1998 | Pieterse et al. ............. 235/380 |
| 5,943,489 A | * | 8/1999 | Shiratori ................ 395/500.37 |
| 6,029,888 A | * | 2/2000 | Harvey ........................ 235/379 |
| 6,137,710 A | * | 10/2000 | Iwasaki et al. ............... 365/52 |
| 6,173,899 B1 | * | 1/2001 | Rozin .......................... 235/492 |
| 6,367,702 B1 | * | 4/2002 | Dietrich et al. ............. 235/492 |
| 6,419,161 B1 | * | 7/2002 | Haddad et al. ............. 235/492 |

FOREIGN PATENT DOCUMENTS

| | | |
|---|---|---|
| EP | 0 662 674 A1 | 7/1995 |
| EP | 0 700 194 A1 | 3/1996 |
| FR | 2 526 977 | 11/1983 |
| FR | 2 771 205 | 5/1999 |
| WO | 96/25828 | 8/1996 |
| WO | 97/46986 | 12/1997 |

* cited by examiner

Primary Examiner—Fritz Fleming
Assistant Examiner—RiJue Mai
(74) Attorney, Agent, or Firm—Burns, Doane, Swecker & Mathis, L.L.P.

(57) ABSTRACT

To execute a program in a second chip card, inserted in a terminal in addition to a first chip card, containing data relating to the owner of the first card, the second card communicates with the terminal through exchanges of commands and responses between the two cards, relayed through exchanges of commands and responses, between first card and the terminal. For example, the terminal is a mobile radio telephone terminal with a SIM card as a first card, not requiring any SIM Toolkit protocol interface between the terminal and the second card. Compatibility and adaptation of the second card to the terminal is provided in the preparation for the execution of the program.

15 Claims, 3 Drawing Sheets

PREPARATION AND EXECUTION OF A PROGRAM IN AN ADDITIONAL CHIP CARD OF A TERMINAL

This disclosure is based upon, and claims priority from, French patent application No. 99-07060, filed Jun. 3, 1999, the contents of which are incorporated herein by reference.

FIELD OF THE INVENTION

This invention relates to the installation of application programs furnished by means of an additional chip card that can be inserted in a terminal. For instance, the terminal can be a mobile radio telephone terminal including a first card for the identification of the subscriber and communications with a telecommunication network, as well as an additional chip card reader.

BACKGROUND OF THE INVENTION

In a cellular GSM-type radio telephone network, provision is made for supplying the subscriber with application services based on the execution of application programs within the SIM chip card. These services are performed via a standardized technology, commonly called the SIM Application Toolkit. A particular functional feature, called proactivity, makes it possible for the SIM card—while the program is being run—to address requests to the outside world: the terminal, the subscriber, and the network.

For example, such application programs comprise menus for consulting a bank server and conducting banking transactions from the terminal at a distance. The development of added-value service applications executed in the SIM card necessitates means for the distribution and maintenance of these applications during the subscription. This is possible by personalizing the SIM card with suitable programs prior to its being sent to the subscriber or by remotely loading via radio or by directly loading these programs in the SIM card at a point of sale.

The personalization of the SIM card is constraining since it requires the advance fixation of the service and the application. It is complex: for any specific operator, as many personalization batches must be created as there are types of service.

Remote loading of application programs via radio, during the lifetime of the SIM card, is currently not in use; the available transmission channels are not suitable due to their low transmission rate.

The third possibility is also constraining since all of the points of sale must be equipped with the means necessary for interfacing the SIM cards with the program loading device.

The prior technique also provides an additional chip card which is distinct from the SIM card and which can be inserted in the terminal or which can be connected to the terminal of the SIM card by an outside reader. The second card is controlled by a program that is being carried out in the SIM card. The terminal plays a transparent role by simply transmitting the commands prepared by the SIM card to the second card. This exchange of commands is intended to develop services that will employ all types of chip cards. For example, the second card can be a bank card offering remote payment services on the mobile terminal.

The second card becomes a way of distributing applications by transporting programs that perform value-added services, such as those that one can currently find in the SIM card.

Several possibilities deriving directly from the current application of SIM Toolkit commands can be foreseen.

According to the first possibility, the application program is remotely loaded from the second card into the SIM card through software in the multiple card reader of the Toolkit application, so that the program may be executed in the SIM card.

According to a second possibility, the program is executed in the second card The program is launched on the command of the SIM card which then leaves the initiative for exchanges of commands and responses, for the execution of the program, to the terminal which communicates directly with the second card.

According to a third possibility, the program is remotely loaded from the second card into the terminal and is executed in an execution software environment initially implemented for this purpose in the terminal.

SUMMARY OF THE INVENTION

The object of the invention is to install an application program in an additional card by using only those types of exchanges which are available on the level of the terminal and of the first card.

To this end, a process for preparing the execution of a program, typically a proactive program, and executing the program in a second chip card, introduced into a terminal, in addition to a first chip card, containing data related to the owner of the first card, is characterized in that the second card communicates with the terminal through exchanges of commands and responses between the two cards, relayed via exchanges of commands and responses between the first card and the terminal.

Thus, according to the invention, all typically proactive exchanges between the terminal and the second card are performed through the first card which, as far as the terminal is concerned, appears as the executor of the program.

In case the terminal is a mobile radio telephone terminal, the first card is a SIM card. In contrast to the second possibility that can be envisaged as mentioned above, it is not necessary, according to the invention, to provide for a second interface between the terminal and the second card, supporting the SIM Toolkit protocol. According to the invention, a SIM Toolkit protocol interface is installed between the two cards, and the terminal plays the role of a transparent relay.

In the detailed description given below, the terminal is connected to a telecommunication network, such as a radio telephone network. However, the terminal can be an autonomous device, or it can be linked to a network, such as the switched telephone network or a digital network with service integration or a specialized or private data transmission telephone network.

To check compatibility between the second card and the terminal, the process involved in the invention comprises the reading of characteristics for the execution of the program in the second card, then the first card, in response to an introduction of the second card into a reading medium connected to the terminal, and an analysis of the characteristics in comparison to the material and software capacities of the first card and/or the terminal to reject the second card when said characteristics are incompatible with at least the terminal.

During the preparations for execution, the process may comprise a phase for the transmission of software and material characteristics of the terminal from the first card to the second card to adapt the second card to the terminal.

During the preparations for the execution of a program, the process involved in the invention comprises preferably also the following phases:

reading, from the first card, a second menu into the second card;

combining, in the first card, the second menu with a first menu, contained in the first card, in a general menu;

transmitting the general menu from the first card to the terminal in order to replace the first menu with the general menu in the terminal.

In this fashion, the subscriber can access, via a single menu, all of the application programs contained in the two cards.

According to a variation, in place of the combination phase, provision is made for a phase to replace a determined item in the first menu with the second menu so as to form the general menu.

As for the execution of the program, the process involved in the invention may comprise the following phases:

transmitting a program identifier from the terminal to the first card;

reading, in the first card, the place of program location corresponding to the identifier;

executing the program via proactive session in the first card if the program is located in the first card; and executing the program via proactive session in the second card if the program is located in the second card.

Thus, when it comes to the execution of a program in the second card, each command or response is run through the first card.

BRIEF DESCRIPTION OF THE DRAWINGS

Other features and advantages of this invention will appear more clearly upon reading the following description of several preferred embodiments of the invention with reference to the attached corresponding drawings where.

DETAILED DESCRIPTION

Figure 1:
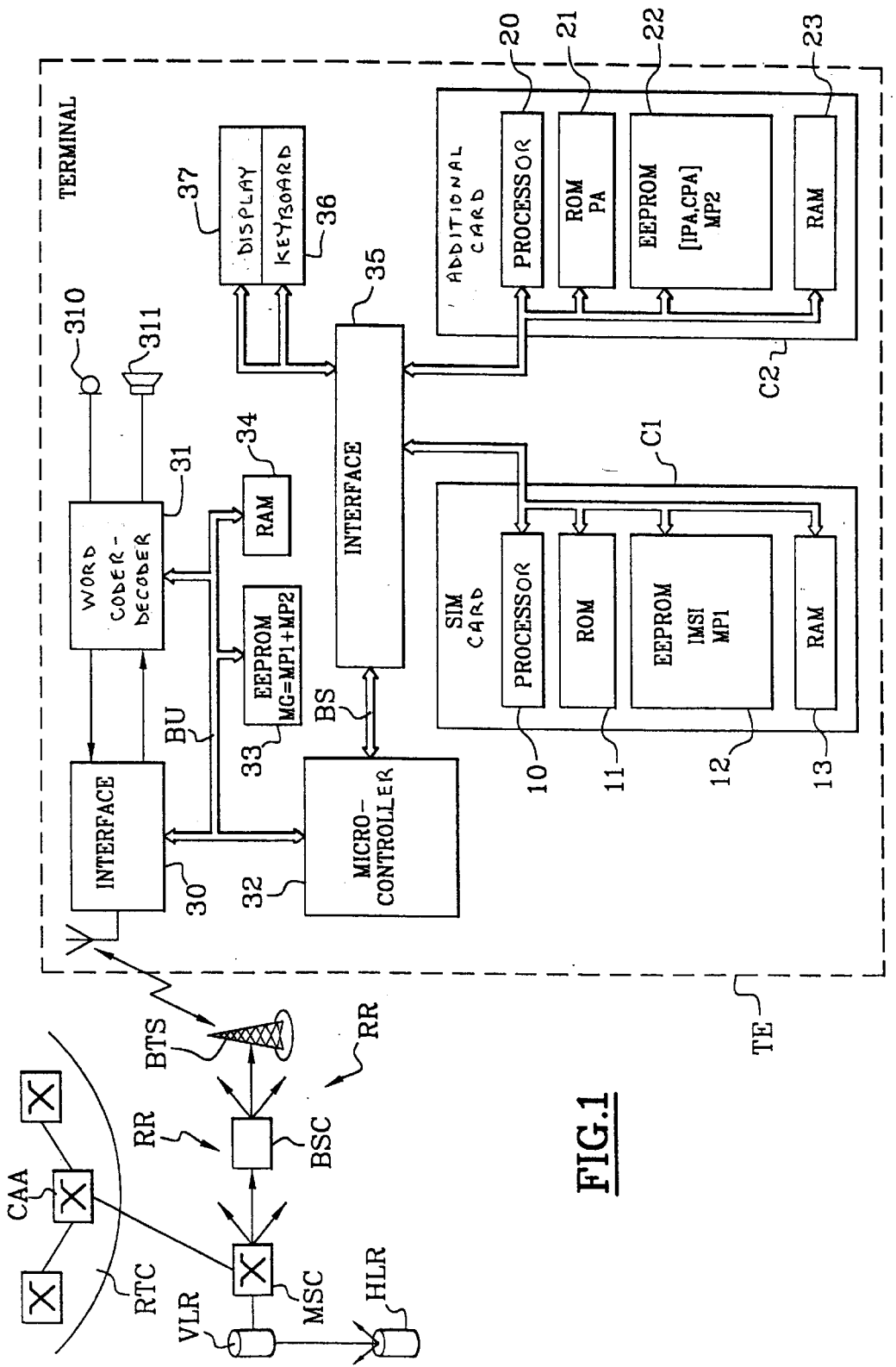
FIG. 1 is a detailed block diagram of a cellular radio telephone network with a mobile terminal.

By way of example, an embodiment of the invention will be described in the context of a telecommunication network of the digital cellular radio telephone network type, as shown in FIG. 1. A mobile radio telephone terminal TE of the radio telephone network comprises a first chip card or smart card C1, constituting a module with a microprocessor that can be removed through the terminal, called the subscriber identity module, as well as a second chip card C2, called the additional application card, linked either to the terminal TE by means of a card reader distinct from the terminal, or housed in a removable manner in the terminal.

In FIG. 1, the network RR is shown in the form of a diagram via a mobile service switch MSC for the location zone where the mobile terminal TE is located at a given instant, and a base station BTS, linked to the mobile service switch MSC by a base station controller BSC and to the terminal TE by radio. The mobile service switch, base station monitor, and base station entities principally constitute a fixed network through which are transmitted in particular messages for signaling to semaphore channels, monitoring, data, and voice. The principal entity of network RR, that is capable of interacting with the first card in the terminal TE, is the mobile service switch MSC, associated with a recorder for the exact location of visitors VLR and linked to at least one telephone switch with autonomous routing CAA of the switched telephone network RTC. The mobile service switch MSC handles communications for mobile visitor terminals, including the terminal TE, which, at a given instant, may be found in the location zone serviced by the mobile service switch MSC. The base station monitor BSC in particular, handles the allocation of channels to the mobile visitor terminals and the base station BTS covers the radio communication cell where the mobile terminal MS may be located at a given instant.

The radio telephone network RR also comprises a nominal location recorder HLR, linked to the visitor location recorders and analogous to a database containing the identity of each subscriber who holds the SIM card, the subscription profile of the subscriber, and the number of the visitor location recorder to which the mobile terminal is momentarily attached.

The terminal TE shown in detail in FIG. 1, comprises a radio interface 30 with radio telephone network RR, comprising mainly a transmission and reception channel duplexer, frequency translation circuits, analog-digital converters and digital-analog converters, a modulator and a demodulator, and a channel coding and decoding circuit. Terminal TE also comprises a word coding and decoding circuit 31, connected to a microphone 310 and a loudspeaker 311, a microcontroller 32, associated with the non-volatile program memory EEPROM 33, and a data memory RAM 34, and an input-output interface 35, servicing chip cards C1 and C2, a keyboard 36 and a graphical display 37. Microcontroller 32 is linked by a bus BU to interface 30, to circuit 31, and to memories 33 and 34, and by another bus BS, to the input-output interface 35. Microcontroller 32 handles all base band processing of data that the terminal receives and transmits after frequency translation, in particular with the relation to protocol layers 1, 2, and 3 of the ISO model, and supervises the exchanges of data between network RR through radio interface 30 and the first chip card C1 through the input-output interface 35.

The SIM chip card C1 is connected to the input-output interface 35, including at least one card reader in the terminal, as well as peripheral connectors of the mobile terminal. Chip card C1 mainly contains a microprocessor 10, a memory 11 of the ROM type, including a system for processing the card and the communication and specific application algorithms according to the invention, a non-volatile memory 12 of the EEPROM type, which contains all features tied to the subscriber, in particular, the international identity of the subscriber IMSI, and a memory 13 of the RAM type, essentially intended for the processing of data to be received from and transmitted to microcontroller 32 included in the terminal and the second card C2.

According to the invention, several software items are mainly remotely loaded into memories ROM 11 and EEPROM 12 to handle applications in additional cards C2. In particular, the preparation algorithm according to the invention, shown in FIG. 2, and the execution algorithm, with a proactive session according to FIG. 3, are implemented in memories 11 and 12.

Just like SIM card C1, the second card C2 also comprises a microprocessor 20 and ROM 21, including a system for processing card C2, and at least partially, an application program PA, or, as a variant, several application programs, that are specifically intended according to the invention, a non-volatile memory 22 of the EEPROM type, containing, according to the invention, an application program identifier IPA, as well as application program characteristics CPA, required for the execution of the program, or, as a program variant, and a memory RAM 23 processes the data to be received from the microcontroller 32 and the processor 10. Card C2 for example, can be a bank card, an electronic money card, a game card, or a business card; in the latter case, the business card is intended to insert the name and telephone number of the person who sent the card in the telephone directory of the SIM card and/or automatically call said person.

The ROM and EEPROM memories 11, 12, 21, and 22 in cards C1 and C2 comprise communication software units for conducting a dialog, on the one hand, with microcontroller 32 of terminal TE and, on the other hand, between processors 10 and 20 through terminal TE, that is to say, through microcontroller 32 and the input-output interface 35.

To conduct a dialog between them, SIM card C1 and the additional card C2 are of the proactive type so as to trigger actions in the mobile terminal TE by means of pre-formatted commands according to the "T=0" protocol of ISO Standard 7816-3 and encapsulated according to recommendation GSM 11.14 (SIM Toolkit). This recommendation permits an extension of the set of commands of the operating system included in memory 11, 21 of chip card C1, C2 to make available to the other card C2, C1, the data that are transmitted through chip card C1, C2.

As described hereinafter, terminal TE is transparent with respect to exchanges of commands and responses between cards C1 and C2 and cannot directly communicate with second card C2, but only through exchanges of commands and responses between the first card C1 and terminal TE. Terminal TE thus supports only the SIM Toolkit protocol in items 32–35 that interface with the first card C1, and no SIM Toolkit protocol is provided directly between microcontroller 32 and processor 20 of card C2.

Figure 2:
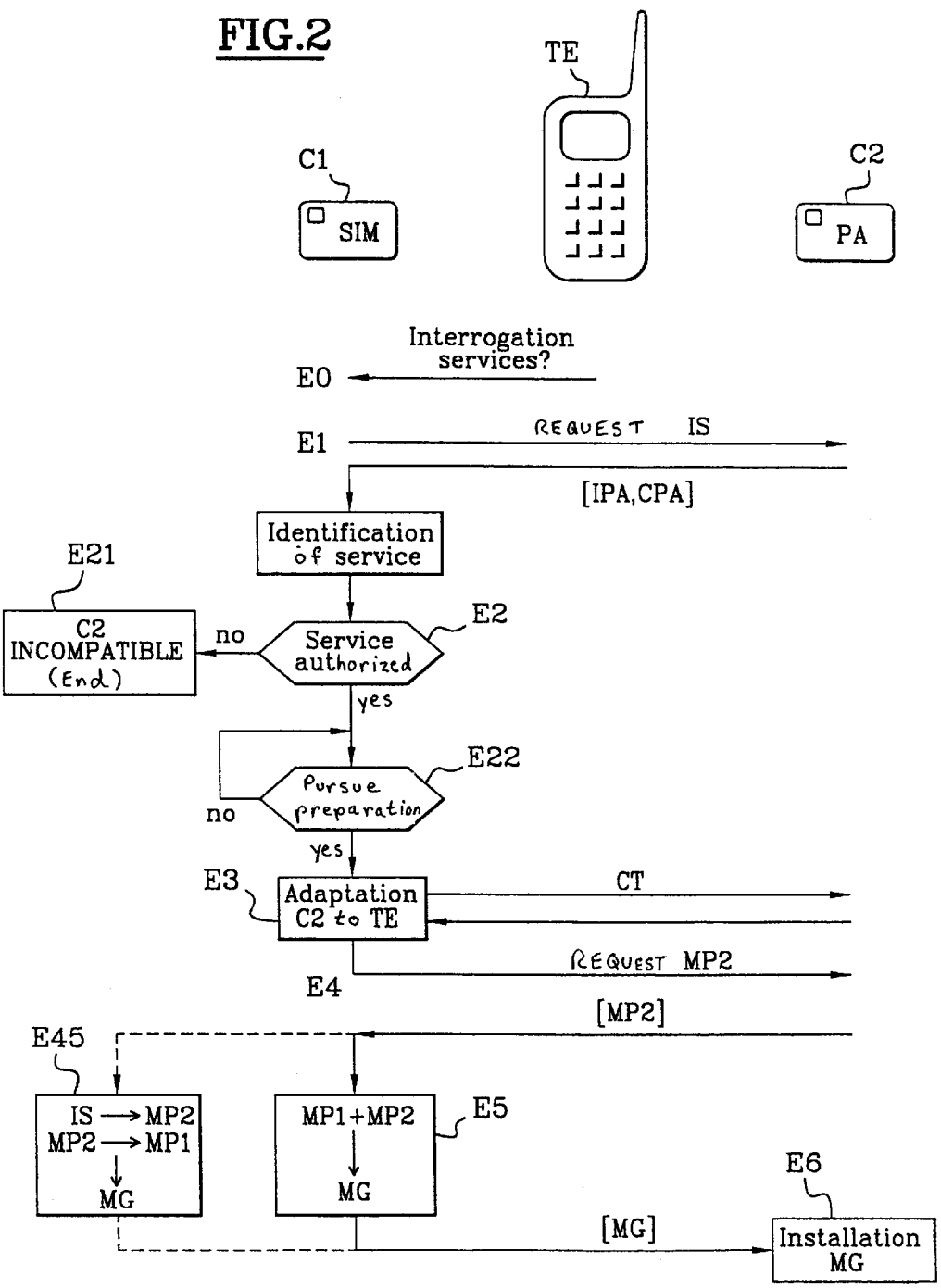
FIG. 2 is an algorithm of the principal phases involved in the preparation of the execution of an application according to the invention.
Figure 3:
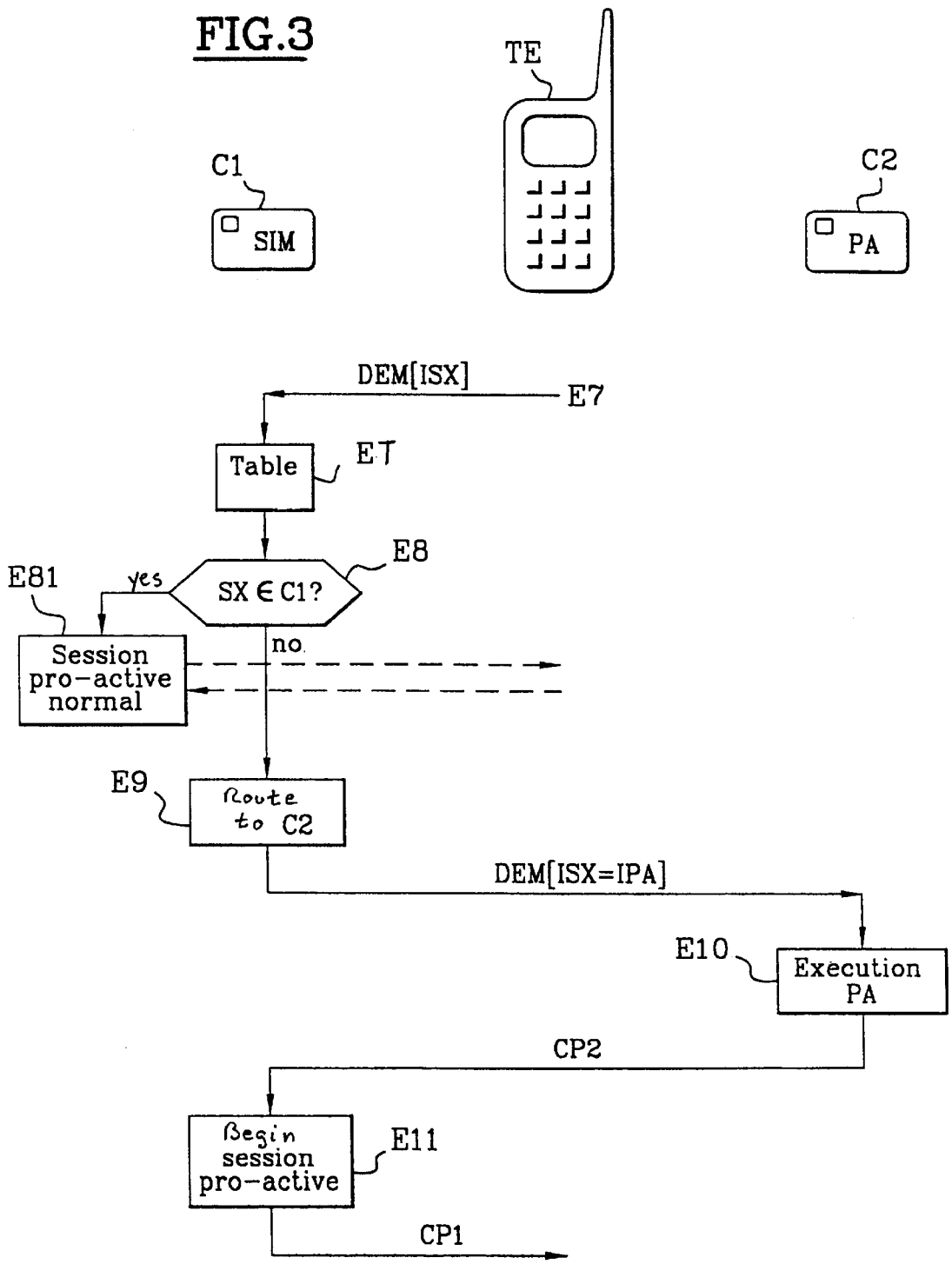
FIG. 3 is an algorithm of phases for the execution of the program following the preparation.

As shown in FIG. 2, preparation for the execution of an application program PA, contained in the second card C2, comprises six principal phases E1 to E6. Initially, the pre-control procedure is triggered in a phase E0, either manually, by pushing a predetermined validation button on the keyboard of terminal TE, or by validating a directive called "VALID INSERTION OF ADDITIONAL CARD," as indicated on the screen of the terminal, after card C2 has been inserted in the reader, or automatically, via terminal TE, in response to a card present message, transmitted by the distinct reader terminal TE or integrated with the input-output interface 35, as shown in card C1. Terminal TE then invites the first card C1, that is, the SIM card, to interrogate the second card C2.

According to the embodiment shown in FIG. 2, everything happens during the following phases E1 to E5, as if terminal TE—in fact, microcontroller 32 and input-output interface 35—is transparent to the data exchanged between the two cards.

In the following phase, E1, card C1 reads and stores, in memory EEPROM 12, service data in memory EEPROM 22 of card C2 through terminal TE. The service information items contain the application program identifier IPA of application program PA and the application program characteristics CPA, required for the execution of the program. The application program characteristics CPA in particular are a type of software environment, a memory storage capacity and material parameters of the TE terminal, necessary for the execution of application program PA as well as an interdiction against or authorization for the execution of application program PA outside the second card C2. Thanks to the service data IS, read in second card C2, the first card C1 has knowledge of the nature of the application corresponding to the application program contained in the second card.

If, upon the next phase E2, the first card C1 finds an incompatibility in terminal TE, including the SIM card C1, with the application program characteristics CPA, then card C1 refuses to continue the preparation process to phase E21, and signals a rejection to terminal TE so that it indicates the message "ADDITIONAL CARD INCOMPATABLE."

In the alternative, card C1 decides to pursue or not to pursue the preparation for an intermediate phase E22. If card C1 does not immediately pursue preparation, for example, because of a call from the terminal, card C1 postpones the preparation in order to have it executed locally, later in card C2.

If, after phase E22, the first card C1 continues the preparation, then the second card C2 is placed in a state that is propitious for the execution of application program PA. During the next phase E3, the first SIM card C1, reproduces, in the second card C2, the results of the protocol negotiation concerning the possibilities of execution of terminal TE that card C1 itself undergoes with the terminal after the preliminary plugging of card C1 in the terminal. Phase E3 essentially involves transmitting the software and the material characteristics CT of terminal TE and, as the case may be, of the first card C1 through the first card to the second card C2 so that card C2 may be adapted to characteristics CT.

The first card C1 then triggers the combination of a principal menu MP1, listing applications contained in card C1, with a principal menu MP2 of application program PA, or as a variant of application programs, contained in the second card C2. This combination of menus involves three phases E4, E5, and E6.

In phase E4, the SIM card C1 transmits a message for the demand of the principal menu MP2 which is read in memory EEPROM 22 of card C2 and is transmitted to memory RAM 13 of card C1. SIM card C1 then, in phase E5, builds a general menu MG, by adding—to the principal menu MP1, listing the services already proposed by the first card C1—the principal menu MP2 of the additional service pertaining to the application program PA dispensed by card C2. General menu MG is transmitted through card C1 to terminal TE so that it may be written in memory EEPROM 33, replacing the first menu MP1, and accessible to the subscriber dropping down on display 37, in phase E6.

As a variation, the first principal menu MP1, already installed in memory EEPROM 33 of the terminal, contains a supplementary item IS to validate the selection of a menu in an additional card, such as card C2. During intermediate phase E45, replacing phase E5, between phases E4 and E6, the supplementary item IS is replaced by the second menu MP2, received in card C1, to be combined with menu MP1 in the general menu MG.

Referring to FIG. 3, the launching of a program execution with a proactive session in one or the other of cards C1 and C2 comprises the following phases E7 to E11.

By means of a specific push button, a turn-on button, or a browsing button on keyboard 36, a service application program SX is triggered by the subscriber in phase E7; in a request DEM[ISX], terminal TE addresses the identifier ISX of the selected program SX to the first card C1.

Card C1 makes a distinction between programs belonging to the first menu MP1 and programs belonging to the second menu MP2 in phase E8. An entity table ET in card C1 is addressed through each program identifier in order to read the entity of location of the latter there, the first card C1 or one of the second cards C2. When the program SX is a program that is initially contained in memories 11–12 of card C1, then card C1 orders at least one proactive standard session between the latter and the terminal to execute the program SX in phase E81.

On the other hand, when the service application program SX is the program application PA, then card C1 converts the program request DEM[ISX], transmitted through the terminal, into another proactive request DEM[ISX=IPA], transmitted from card C1 to the second card C2 during phase E9 so as to launch the execution of the program PA, contained in card C2, in phase E10. As illustrated in FIG. 3, the execution of program PA comprises at least one proactive session E11, consisting first of all of a proactive response CP2, transmitted by the second card C2, following the command DEM [ISX=IPA] to the first card C1, which itself relays this command CP2, in a proactive command similar to CP1, to terminal TE.

The execution of application PA provides a service to the subscriber, for example, by indicating text menus on the display 37, acquisition of subscriber data through the SIM card C1, sending requests to the network RR or the RTC, or interpreting responses to requests. All of the exchanges of commands and responses are carried on between card C2 and terminal TE through card C1 which creates the illusion of a terminal that contains and executes the program PA itself.

What is claimed is:

1. A process for the preparation of the execution of a program and execution of the program in a second chip card, introduced in a terminal, in addition to a first chip card containing data related to the owner of the first card, comprising the step wherein the second card communicates with the terminal through exchanges of commands and responses between the two cards relayed by exchanges of commands and responses between the first card and the terminal.

2. The process according to claim 1, further including the steps of reading characteristics for the execution of the program in the second card by the first card in response to an introduction of the second card into a reading medium that is linked to the terminal, and analysis of the characteristics in comparison to the material and software capacities of the first card and/or the terminal, to reject the second card when said characteristics are incompatible with at least the terminal.

3. The process according to claim 2, further including, during the preparation for execution, a step involving the transmission of the software and material characteristics of the terminal from the first card to the second card.

4. The process according to claim 2, further including the following steps for the preparation of the execution:

reading, by the first card, a second menu in the second card;

combining in the first card the second menu with a first menu contained in the first card, to form a general menu; and transmitting the general menu from the first card to the terminal to replace the first menu with the general menu in the terminal.

5. The process according to claim 4, wherein said combining step comprises the step of replacing a predetermined item in the first menu with the second menu to form the general menu.

6. The process according to claim 2, further including the following steps for the execution of the program:

transmitting an identifier of the program from the terminal to the first card;

reading in the first card the location of the program corresponding to the identifier;

executing the program in the first card if the program is located in the first card; and executing the program in the second card if the program is located in the second card.

7. The process according to claim 1, wherein the terminal is linked to a telecommunication network.

8. The process according to claim 7, wherein said network is a radio telephone network.

9. The process according to claim 1, further including, during the preparation for execution, a step involving the transmission of the software and material characteristics of the terminal from the first card to the second card.

10. The process according to claim 1, further including the following steps for the preparation of the execution:

reading, by the first card, a second menu in the second card;

combining in the first card the second menu with a first menu contained in the first card, to form a general menu; and transmitting the general menu from the first card to the terminal to replace the first menu with the general menu in the terminal.

11. The process according to claim 10, wherein said combining step comprises the step of replacing a predetermined item in the first menu with the second menu to form the general menu.

12. The process according to claim 1, further including the following steps for the execution of the program:

transmitting an identifier of the program from the terminal to the first card;

reading in the first card the location of the program corresponding to the identifier;

executing the program in the first card if the program is located in the first card; and executing the program in the second card if the program is located in the second card.

13. In a terminal having a first chip card containing data related to the owner of the first card, a process for the preparation of the execution of a program in a second chip card, comprising the following steps:

reading, by the first card, a second menu in the second card;

combining in the first card the second menu with a first menu contained in the first card, to form a general menu; and transmitting the general menu from the first card to the terminal for display.

14. The process according to claim 13, wherein said combining step comprises the step of replacing a predetermined item in the first menu with the second menu to form the general menu.

15. In a terminal having a first chip card containing data related to the owner of the first card, and a second chip card containing at least one program, a process for the execution of a program, comprising the following steps:

transmitting an identifier of the program from the terminal to the first card;

reading in the first card the location of the program corresponding to the identifier;

executing the program in the first card if the program is located in the first card; and executing the program in the second card if the program is located in the second card.

* * * * *